United States Patent
Nielsen et al.

(10) Patent No.: US 9,886,565 B2
(45) Date of Patent: Feb. 6, 2018

(54) USER-SPECIFIC VISUALIZATION OF DISPLAY ELEMENTS

(71) Applicant: Microsoft Technology Licensing, LLC, Redmond, WA (US)

(72) Inventors: Brian Nielsen, Roskilde (DK); Per Reitzel, Virum (DK); Elly Nkya, Virum (DK); Anders Larsen, Horsholm (DK)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 32 days.

(21) Appl. No.: 14/514,128

(22) Filed: Oct. 14, 2014

(65) Prior Publication Data
US 2015/0371016 A1    Dec. 24, 2015

Related U.S. Application Data

(60) Provisional application No. 62/015,029, filed on Jun. 20, 2014.

(51) Int. Cl.
*G06F 21/00* (2013.01)
*G06F 21/10* (2013.01)
*G06F 21/62* (2013.01)

(52) U.S. Cl.
CPC .......... *G06F 21/105* (2013.01); *G06F 21/629* (2013.01); *G06F 21/6218* (2013.01); *G06F 2221/2125* (2013.01); *G06F 2221/2149* (2013.01)

(58) Field of Classification Search
CPC .. G06F 21/105; G06F 21/6218; G06F 21/629; G06F 2221/2125; G06F 2221/2149

USPC ................................................. 726/27, 2, 26
See application file for complete search history.

(56) References Cited

U.S. PATENT DOCUMENTS

| 6,320,602 B1 * | 11/2001 | Burkardt | G06F 9/4443 715/817 |
| 6,973,626 B1 | 12/2005 | Lahti et al. | |
| 7,346,840 B1 * | 3/2008 | Ravishankar | G06F 17/3089 707/E17.116 |
| 7,620,894 B1 | 11/2009 | Kahn | |

(Continued)

FOREIGN PATENT DOCUMENTS

WO    2014075189 A1    5/2014

OTHER PUBLICATIONS

Lin, Li, Li, "Automatically Update a Web Page with Dynamic Elements", Published on: Oct. 13, 2009 Available at: http://www.ibm.com/developerworks/library/wa-aj-dynamic/.

(Continued)

*Primary Examiner* — Sarah Su
(74) *Attorney, Agent, or Firm* — Christopher J. Volkmann; Kelly, Holt & Christenson PLLC

(57) ABSTRACT

A user input is received for accessing a page in an application. Page display element metadata is retrieved that defines how the display elements are related to other objects in the application. It is determined whether the user has license rights and user permissions to access the information represented by the related objects. If not, the display elements are removed, hidden or disabled and a remainder of the page is rendered.

20 Claims, 17 Drawing Sheets

(56) References Cited

U.S. PATENT DOCUMENTS

| | | | |
|---|---|---|---|
| 7,689,583 B2* | 3/2010 | Bozich | G06F 17/30011 707/803 |
| 8,225,213 B2* | 7/2012 | Siegal | G06Q 10/10 715/741 |
| 8,418,070 B2 | 4/2013 | Mayer-Ullmann | |
| 8,555,249 B2 | 10/2013 | Demant et al. | |
| 8,707,398 B2 | 4/2014 | Rauh et al. | |
| 9,100,385 B1* | 8/2015 | Reddy | H04L 67/2823 |
| 9,116,888 B1* | 8/2015 | Wang | G06F 17/30 |
| 2006/0053370 A1* | 3/2006 | Hitaka | G11B 27/034 715/251 |
| 2007/0077665 A1* | 4/2007 | Bump | G05B 19/41845 438/14 |
| 2007/0100882 A1* | 5/2007 | Hochwarth | G06Q 10/10 |
| 2007/0180432 A1* | 8/2007 | Gassner | G06F 9/06 717/136 |
| 2008/0092068 A1 | 4/2008 | Norring et al. | |
| 2008/0270915 A1* | 10/2008 | Tevanian | G06F 17/3089 715/751 |
| 2009/0144723 A1* | 6/2009 | Hartin | G06F 8/65 717/173 |
| 2009/0279110 A1* | 11/2009 | Ito | G06K 1/121 358/1.5 |
| 2009/0327867 A1* | 12/2009 | Nielsen | G06F 17/2247 715/239 |
| 2011/0066951 A1* | 3/2011 | Ward-Karet | H04L 43/0894 715/744 |
| 2011/0078103 A1* | 3/2011 | Teng | G06F 9/4443 706/47 |
| 2011/0191303 A1* | 8/2011 | Kaufman | G06F 17/30286 707/684 |
| 2011/0265188 A1 | 10/2011 | Ramaswamy et al. | |
| 2012/0166976 A1* | 6/2012 | Rauh | G06F 8/38 715/762 |
| 2013/0019150 A1* | 1/2013 | Zarom | H04N 21/25891 715/204 |
| 2013/0086481 A1 | 4/2013 | Balasaygun et al. | |
| 2013/0145453 A1* | 6/2013 | Lemke | G06F 21/31 726/16 |
| 2013/0174047 A1 | 7/2013 | Sivakumar et al. | |
| 2013/0339907 A1* | 12/2013 | Matas | G06T 11/60 715/853 |
| 2014/0026037 A1* | 1/2014 | Garb | G06F 17/30893 715/235 |
| 2014/0032733 A1 | 1/2014 | Barton et al. | |
| 2014/0115701 A1 | 4/2014 | Moshchuk et al. | |
| 2017/0031882 A1* | 2/2017 | Myers | G06F 17/2247 |
| 2017/0177326 A1* | 6/2017 | Brooks | G06F 8/68 |

OTHER PUBLICATIONS

International Search Report and Written Opinion for International Application No. PCT/US2015/036560, dated Sep. 4, 2015, date of filing: Jun. 19, 2015, 12 pages.

Anonymous: "Create a Form with the Form Builder", Mar. 9, 2012, Retrieved from the Internet: URL: http://help.clickdimensions.com/create-a-form-with-the-form-builder/, retrieved on Aug. 27, 2015, 18 pages.

Second Written Opinion for International Patent Application No. PCT/US2015/036560, dated May 2, 2016, date of filing: Jun. 19, 2015, 7 pages.

Anonymous:"Create a Form with the Form Builder", Apr. 7, 2014, Retrieved from the Internet: URL:http://web.archive.org/web/20140407142921/http://help.clickdimensions.com/create-a-form-with-the-form-builder/ Retrieved on: Jan. 26, 2016.

International Preliminary Report on Patentability for International Patent Application No. PCT/US2015/036560, dated Sep. 9, 2016, date of filing: Jun. 19, 2015, 8 pages.

* cited by examiner

236

| Field B - Properties | |
|---|---|
| Property | Value |
| Field No. | |
| Name | |
| Caption | |
| ⋮ | |
| AccessByPermission | |
| ⋮ | |

USER-SPECIFIC VISUALIZATION OF DISPLAY ELEMENTS

CROSS-REFERENCE TO RELATED APPLICATION

The present application is based on and claims the benefit of U.S. provisional patent application Ser. No. 62/015,029, filed Jun. 20, 2014, the content of which is hereby incorporated by reference in its entirety.

BACKGROUND

Computer systems are currently in wide use. Many computer systems run applications that generate forms or pages which act as mechanisms for visualizing information within the application or accessed by the application.

Users of applications are often subject to user permissions or license rights. For example, within a computer system, a user may have certain permissions to see certain items of data, but the user may be restricted from seeing other items of data. By way of example, a sales person in a company may have permissions to see and otherwise access sales data, but may not have permissions to see or otherwise access project management data. Similarly, a project manager may have permissions to see and access project management data, but may not have permissions to see and access sales data.

The same is true of license rights. Certain users of a computer system may have purchased or otherwise obtained a license at a first level, which entitles them to access various data and/or functionality. Other users may have purchased or otherwise obtained a license at a second level that allows them to access a different set of data and/or functionality. A user with the first license may not be able to access data or functionality permitted to a user with the second license.

Some examples of computer systems that have a relatively large number of forms or pages include business systems. Business systems include, for example, enterprise resource planning (ERP) systems, customer relations management (CRM) systems, line-of-business (LOB) systems, among others. When a user of such a system attempts to access data that the user has no permission or rights to access, the computer system commonly throws an error, and displays only an error message for the user.

The discussion above is merely provided for general background information and is not intended to be used as an aid in determining the scope of the claimed subject matter.

SUMMARY

A user input is received for accessing a page in an application. Page display element metadata is retrieved that defines how the display elements are related to other objects in the application. It is determined whether the user has license rights and user permissions to access the information represented by the related objects. If not, the display elements are removed and a remainder of the page is rendered.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 5A-5C show examples of user interface displays.

DETAILED DESCRIPTION

Figure 1:
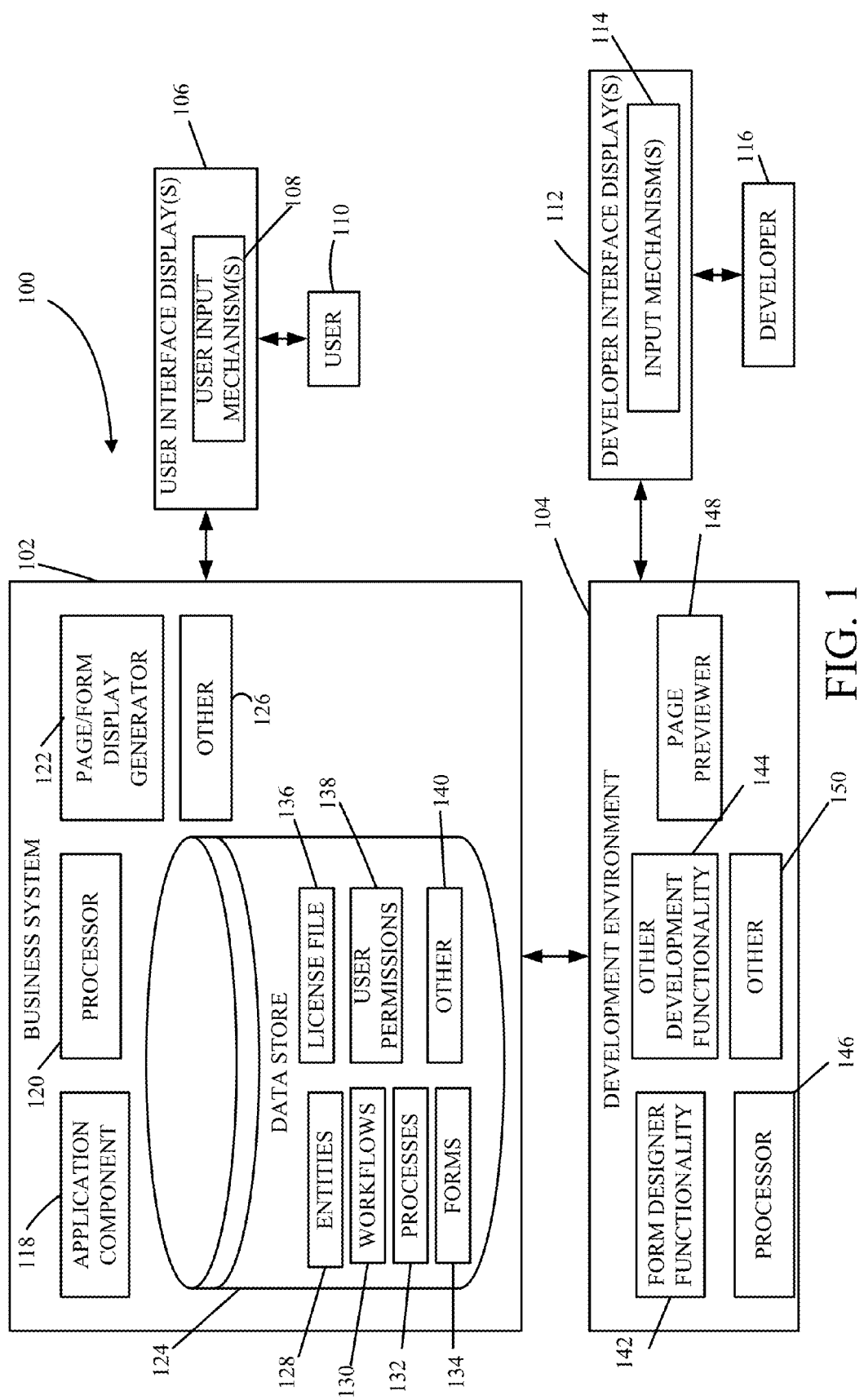
FIG. 1 is a block diagram of one example of a computing architecture.

FIG. 1 is a block diagram of one example of a computing architecture 100. Computing architecture 100 includes business system 102 and developer environment 104. FIG. 1 shows that business system 102 can generate user interface displays 106 with user input mechanisms 108 for interaction by one or more users 110. Users 110 interact with user input mechanisms 108 in order to control and manipulate business system 102.

FIG. 1 also shows that development environment 104 generates developer interface displays 112 with input mechanisms 114 for interaction by developer 116. Developer 116 illustratively interacts with input mechanisms 114 in order to control and manipulate development environment 104 to develop parts of business system 102.

Before proceeding with the present description, it will be noted that business system 102 can be an ERP system, a CRM system, an LOB system, or a wide variety of other types of business systems. Also, a business system is described by way of example only. The user-specific visualizations described herein can be applied to a wide variety of other computer systems as well, such as document management systems, electronic mail or other messaging systems, among others. Further, the terms page and form will be used interchangeably herein. They are, in one example, a mechanism by which information from a computer system is displayed to a user. A computer system that generates a form or page as a mechanism by which to display information to a user can utilize the user-specific visualization described herein. Thus, while the present description will proceed with respect to the computer system being a business system 102, it will be appreciated that that is only one example.

In the example shown in FIG. 1, business system 100 includes application component 118, processor 120, page/form display generator 122, data store 124, and it can include other items 126 as well. Data store 124 includes entities 128, workflows 130, processes 132, forms 134, a license file 136, user permissions 138, and it can include other items 140 as well.

Entities 128 illustratively describe and define concepts within business system 102. For instance, a vendor entity describes and defines a vendor. A product entity describes and defines a product. A quote entity describes and defines a quote. A business opportunity entity describes and defines a business opportunity. Entities can include a more rich set of features and functionality than an object, but they are intended to include objects as well. Forms 134 define user interface display pages and are used as a mechanism by which user 110 can visualize data. License file 136 illustratively stores the license details corresponding to the licenses that have been obtained by each of the users 110. Thus, they include license rights which indicate what rights each user 110 has to the various items in business system 102. User permissions 138 illustratively describe the permissions that have been granted to each user 110 within business system 102. This can be based on a user profile for each user or based on other information.

Application component 118 runs one or more business applications in system 102. The business applications implement workflows 130 and processes 132 and illustratively operate on data stored as entities 128 and other data records 140. Thus, in one example, application component 118 can run general ledger applications or a wide variety of other accounting applications. It can run inventory tracking applications, business opportunity applications that track business opportunities within system 102, and it can run a wide variety of other applications.

Page/form display generator 122 illustratively receives an indication that a user 110 has requested the visualization of a page or form 134. As is described in greater detail below, generator 122 accesses metadata for user 110 (such as profile information, role-information, etc.) and controls what is displayed to user 110. For instance, if the user has insufficient access rights to a user interface element, it is not displayed. In the example discussed below, generator 122 accesses the license file 136 and user permissions 138 for user 110 to determine what display elements on the requested form or page should be displayed. This is an example only. It removes, hides or disables elements that are not to be displayed, and provides a representation of the page, without those elements, for rendering to user 110.

Development environment 104 illustratively includes form (or page) designer functionality 142, other development functionality 144, processor 146, page previewer 148, and it can include other items 150 as well. Developer 116 illustratively provides inputs using form designer functionality 142 in order to generate metadata that defines various forms 134 and other pages displayed by business system 102. The other development functionality 144 can be accessed by developer 116 in order to generate other functionality within business system 102. As is described in greater detail below with respect to FIG. 5, and in one example, developer 116 can use form designer functionality 142 to select various license rights and user permissions and have page previewer 148 generate a preview display that indicates what any given page will look like with the selected license rights and user permissions.

Figure 2:
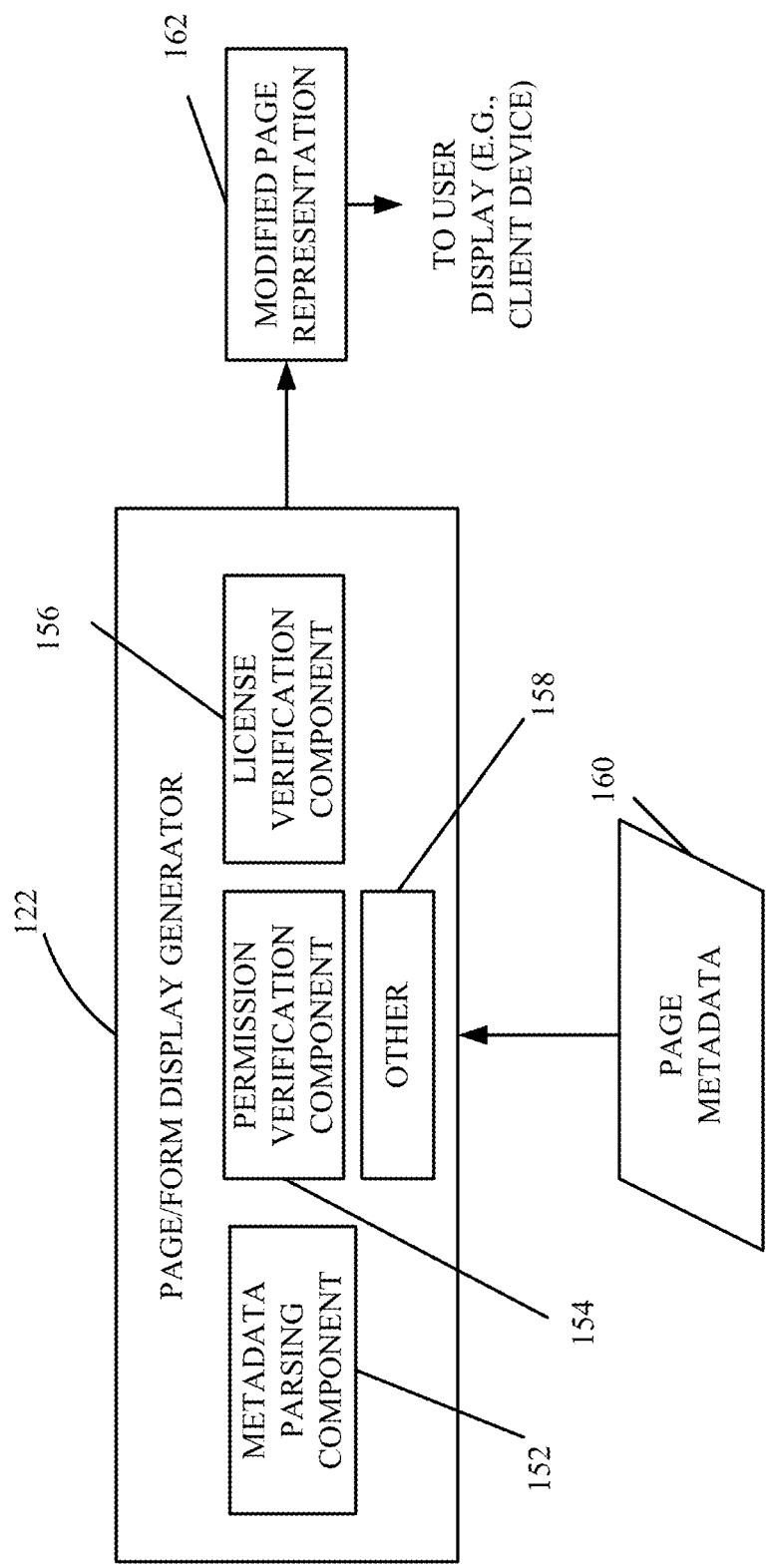
FIG. 2 is a more detailed block diagram of one example of a page/form display generator.

FIG. 2 is a block diagram of one example of page/form display generator 122 in more detail. In the example shown in FIG. 2, generator 122 includes metadata parsing component 152, permission verification component 154, license verification component 156, and it can include other items 158 as well. Page/form display generator 122 illustratively receives page metadata 160 that defines a page or form that the user has requested for display. Metadata parsing component 152 parses metadata 160 to identify the various elements on the page or form. License verification component 156 compares the various items on the page to be displayed (as defined by page metadata 160) to the license rights of the user. User permission verification component 154 compares the items on the page to the user permissions of the user. The UI display elements that the user does not have authorization to see (either the user is not licensed to see or the user does not have permissions to see) are removed from, hidden or disabled on the renderable version of the page. The modified page presentation 162 is then output for user display, such as on a client device.

In this way, the page is displayed in a form which is simpler for the user. Items that the user does not have permission to see are not displayed. Actions related to items that the user does not have permission to access are not displayed. Subpages that the user does not have permission to access are not displayed, etc. Thus, the user is presented with a page that contains only the information that the user needs to, and has authorization to, view.

Figure 3A:
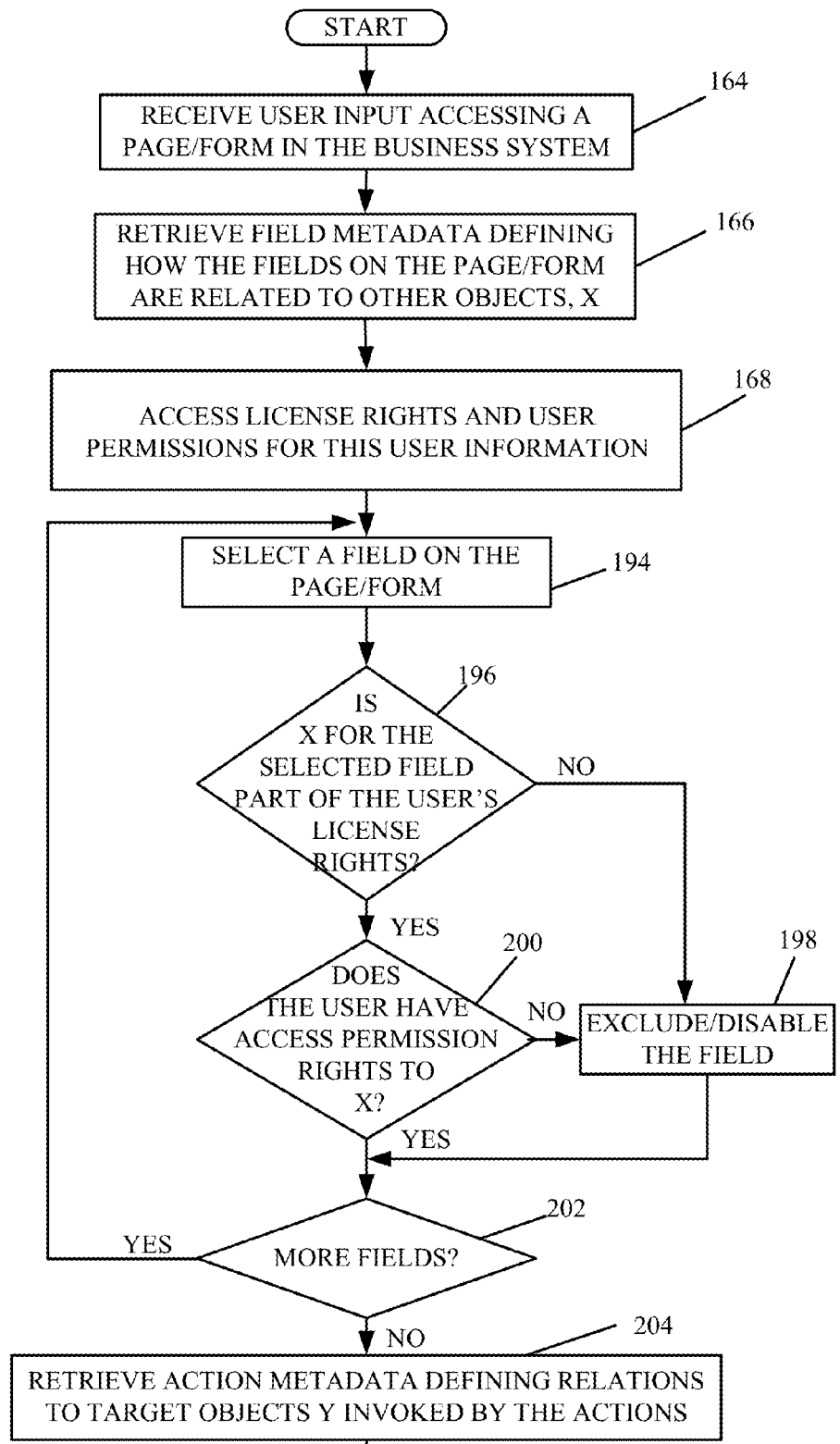
FIGS. 3A and 3B (collectively FIG. 3) show a flow diagram illustrating one example of the operation of the architecture shown in FIG. 1 in generating page visualizations based on user permissions and license rights.
Figure 3B:
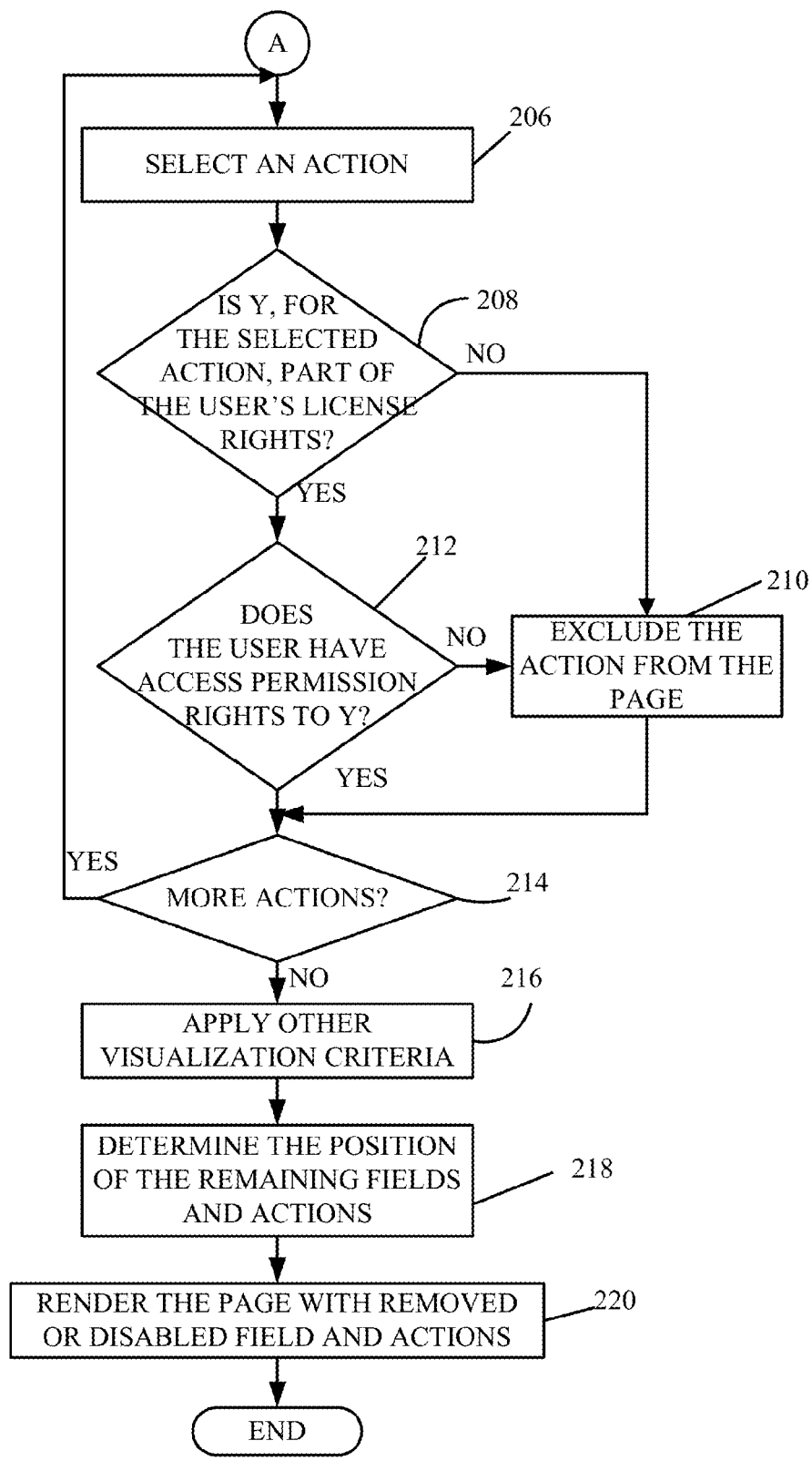

FIGS. 3A and 3B (collectively FIG. 3) illustrate a flow diagram showing one example of the operation of architecture 100 (shown in FIG. 1) and specifically page/form display generator 122 (shown in more detail in FIG. 2) in analyzing and removing, hiding or disabling UI elements from a page, based on user permissions and user license rights. The example described with respect to FIG. 3 illustrates how generator 122 can remove fields and actions from a display based on user permissions and user license rights. It will be appreciated, of course, that while SubPages (or Page Parts) are not mentioned specifically in the description of FIG. 3, the same description can apply with respect to SubPages or other UI elements of a page or form. The description with respect to fields and actions is provided for the sake of example only.

It is also assumed with respect to FIG. 3 that the UI element removal mechanisms in generator 122 are activated or enabled. For instance, in one example, none of the elements in generator 122 are enabled and therefore no UI elements will be removed based on either the user's license rights or permissions. In another example, license verification component 156 can be enabled, but permission verification component 154 can be disabled. In that example, UI elements will be removed based only on the user's license rights. In yet another example, both components 154 and 156 are enabled. Therefore, UI elements will be removed from the page based on the user's license rights and based on the user's permissions in business system 102. The example described with respect to FIG. 3 assumes that both components are enabled.

Business system 102 first receives a user input from user 110 indicating that the user wishes to access a page or form in the business system. This is indicated by block 164 in FIG. 3.

Figure 4A:
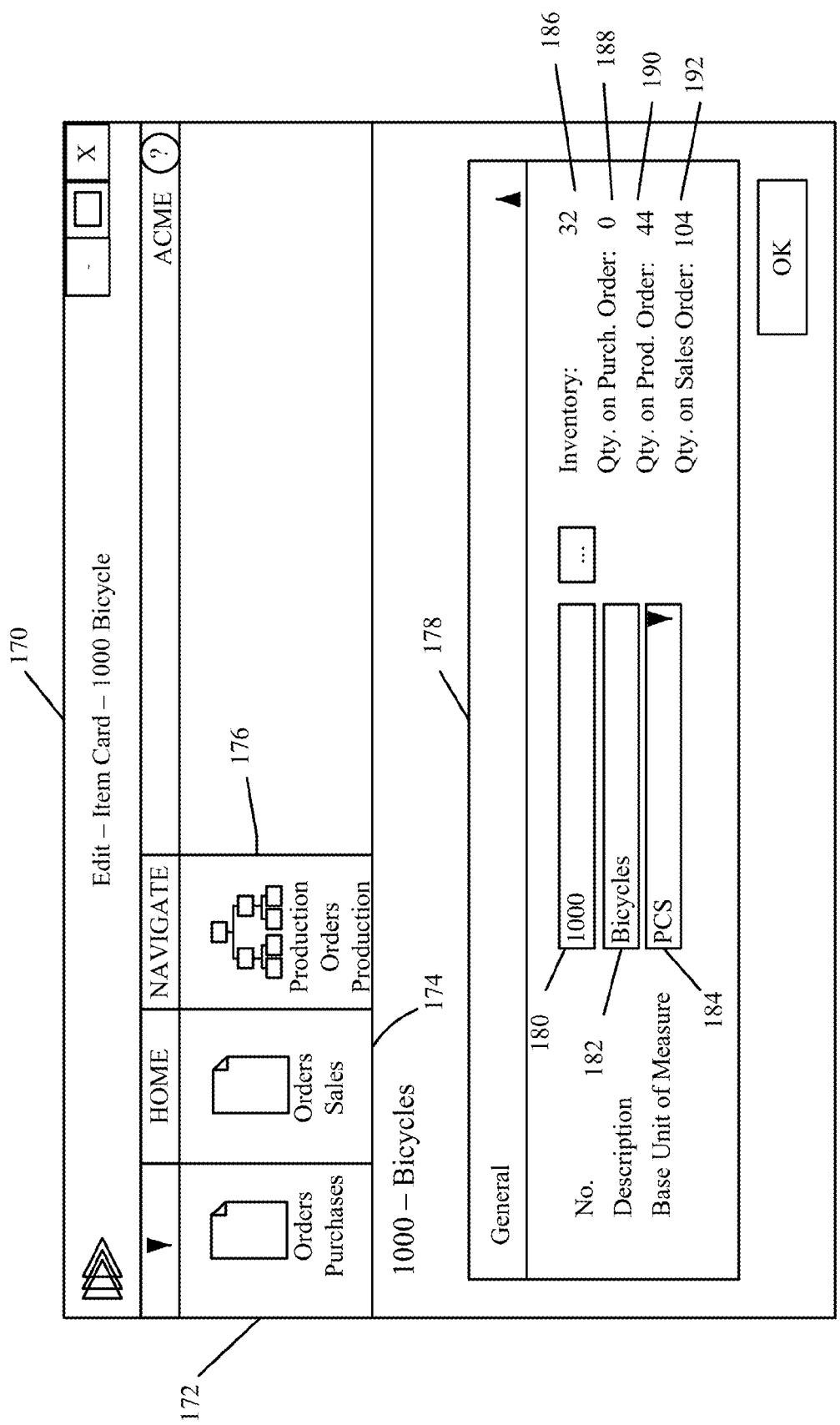
FIGS. 4A and 4B show examples of user interface displays.

FIG. 4A shows one example of a user interface display 170. User interface display 170 is a page that shows an item card. The item card includes a set of actions represented by the purchase orders button 172, the sales orders button 174, and the production orders button 176. Actuation of those buttons allows the user to view the underlying set of data (e.g., purchase orders, sales orders and production orders) in business system 102. Display 170 also includes an item display section 178 that, itself, includes a plurality of different fields, including a quantity field 180, a description field 182, a unit of measure field 184, an inventory indicator 186, a purchase order indicator 188, a production order indicator 190, and a sales order indicator 192. FIG. 4A shows a representation of page 170 without any of the UI elements on the page removed. Therefore, if the UI removal components shown in FIG. 2 (the permission verification component 154 and the license verification component 156) were both disabled, then the page would be displayed as it is shown in FIG. 4A.

Page/form display generator 122 then receives field metadata defining how the fields on the page or form 170 that the user has requested are related to other objects. The other objects are referred to herein by the designator X. Retrieving the field metadata is indicated by block 166 in FIG. 3.

License verification component 156 then accesses the license rights of the requesting user 110, and permission verification component 154 accesses the user permissions for the requesting user. This is indicated by block 168 in FIG. 3. Table 1 below shows one example of a set of license rights and Table 2 below shows one example of a set of user permissions. It can be seen in Table 1 that the user has license rights to sales and inventory information in business system 102, but not to manufacturing or purchasing information. Table 2 shows that the user's profile is a sales order processor and that the user has read permissions to items and edit permissions to sales orders in business system 102. It also lists specific objects (tables, pages, etc.) and the associated permissions that are granted to the user.

TABLE 1

| | License | |
|---|---|---|
| Sales | Table Sales Order Page Sales Order | Yes |
| Inventory | Table Item Page Item Card | Yes |
| Manufacturing | Table Production Order Page Production Order | No |
| Purchases | Table Purchase Order Page Purchase Order | No |

TABLE 2

| | User Permission | | |
|---|---|---|---|
| Profile | Permissions | Objects | Active |
| Sales Order processor | Read Item | Table Item = R Page Item = X | Yes |
| | Edit Sales Order | Table Sale Order = RIMD Page Sales Order = X | |
| Production Manager | Edit Item | Table Item = RIMD Page Item = X | |
| | Edit Sales Order | Table Production Order = RIMD Page Production Order = X | |

R = Read,
I = Insert,
M = Modify,
D = Delete,
X = Execute permissions

Page/form display generator 122 then selects a field on the page 170. This is indicated by block 194 in the flow diagram of FIG. 3A. The metadata will indicate that the selected field is related to an object X in business system 102. License verification component 156 then determines whether the user has license rights to access the object X related to the selected field. This is indicated by block 196. If not, then the selected field is removed or excluded from the ultimate display that the user will see. This is indicated by block 198.

This can be done in a variety of different ways. For instance, generator 122 can generate a modified representation 162 of the page containing only the UI elements that the user is permitted to see or interact with. When the user does not have access to the object X, component 156 can remove the corresponding field from the modified representation, as the modified representation is being generated in memory. In another example, a separate component can remove the field before the page is shown to the user. For instance, component 156 can mark the field as one to be removed for this user. Another component can remove it before the page is displayed. Where the page is sent to a client device, a component on the client device can remove it, for example. Alternatively, the page can be generated on a server, where the field is removed, and the page can then be sent to the client device. These are examples only.

However, if, at block 196, license verification component 156 determines that the user has license rights to the object X, then permission verification component 154 determines whether the user has user permissions within business system 102 to the object X. This is indicated by block 200 in FIG. 3. If not, again the field that is related to object X is excluded or disabled on the user interface display that will be rendered to the user. If, at block 200, it is determined that the user does have permission to access the object X, then the UI element is not removed.

Page/form display generator 122 then determines whether there are any more fields to be evaluated on the requested page. This is indicated by block 202. If so, processing reverts to block 194. The process continues for each field on the page.

Once the field processing is complete, then page/form display generator 122 retrieves the metadata for the requested page that defines relations to target objects that are invoked by the actions on the page. The target objects are identified by the reference Y. Retrieving the metadata defining relations between actions on the requested page and target objects is indicated by block 204 in FIG. 3. As an example, it may be that the orders button 172 on display 170 in FIG. 4A has, as a target object, purchase order information in the purchasing system of business system 102. Similarly, the orders button 174 may have, as a target object, sales order information in the sales system. Production orders button 176 may have, as a target object, production information in the production system. The requesting user 110 may have license rights or permissions that allow the user to see those target objects, or the user may not.

Therefore, page/form display generator 122 first selects an action on the page to be displayed. This is indicated by block 206 in the flow diagram of FIG. 3. License verification component 156 then determines whether the target object Y for the selected action is part of the user's license rights. This is indicated by block 208. If not, then the selected action is excluded from the display of the page that will be rendered to the requesting user. This is indicated by block 210. This can be done in a similar way as described above with respect to fields, or differently. However, if the user does have license rights to the selected action, then permission verification component 154 determines whether the requesting user has user permissions within business system 102 to the target object Y corresponding to the selected action. This is indicated by block 212. Again, if the user does not have such permissions, then the selected action is removed from the display that will be shown to the user. If so, however, then the selected action will be displayed to the user.

Page/form display generator 122 then determines whether there are any more actions on the requested page that are to be analyzed. This is indicated by block 214. If so, processing reverts to block 206 where additional actions are analyzed. If not, processing proceeds to block 216 where the system can apply any other visualization criteria. It then determines the location of any remaining display elements on the page, as indicated by block 218 and outputs the modified page representation 162 for rendering to the user. This is indicated by block 220. The output will have the fields and actions identified above removed from the ultimate display.

Generator 122 can determine the location of the remaining elements in a variety of ways. It can access display rules that indicate how the elements are to be displayed. The rules can be built into the metadata defining the page, itself, or elsewhere. Alternatively, the metadata can be structured to define the location of remaining elements, without generator 122 accessing any separate rules. In another example, generator 122 removes the elements that are to be removed and does not change the location of the remaining elements. Also, generator 122 can position the remaining elements so they cover unused areas left by the removed elements. Generator 122 can position the remaining elements in other ways as well.

Figure 4B:
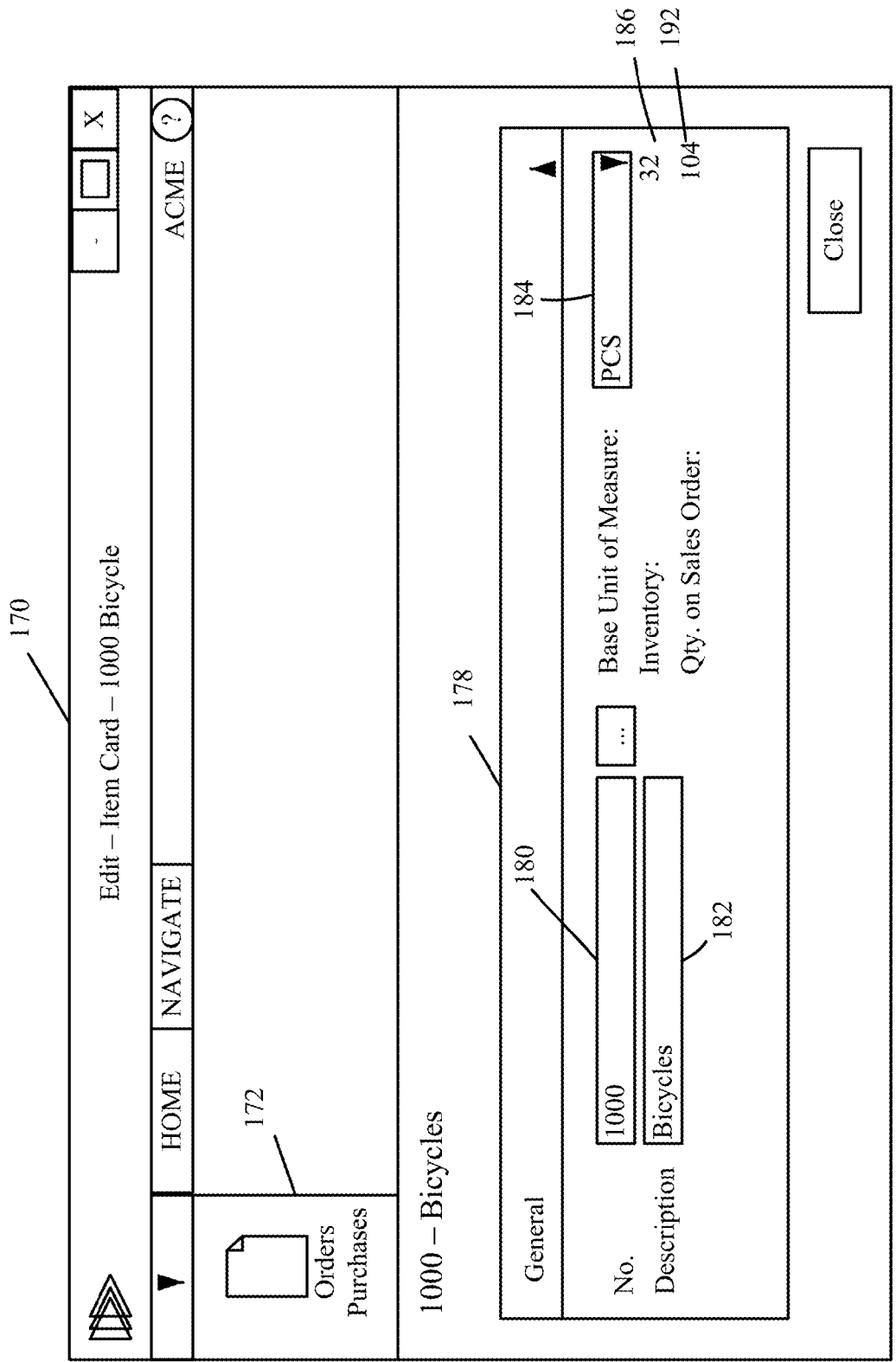

FIG. 4B shows another example of page 170 that is displayed after UI elements are removed, based on the user's permissions and license rights. It can be seen in FIG. 4B that the purchase orders action represented by button 172 has been removed because it is not in the user's permissions. The sales orders action represented by button 174 is maintained because it is both in the user's license rights and the user's permissions. The production orders action represented by button 176 is removed because it is not in the user's license rights. All of the item card fields on display portion 178 are displayed in non-editable form, because the user is only given read access to the item table in the user's permissions. The "quantity on purchase order" field 190 (shown in FIG. 4A) is removed because the user does not have license rights to the purchasing system. The "quantity on production order" field 188 is also removed because the user does not have license rights to the manufacturing or production system. It can thus be seen that the display that is ultimately rendered to the user is user-specific and therefore simplified for the user.

Figure 5:
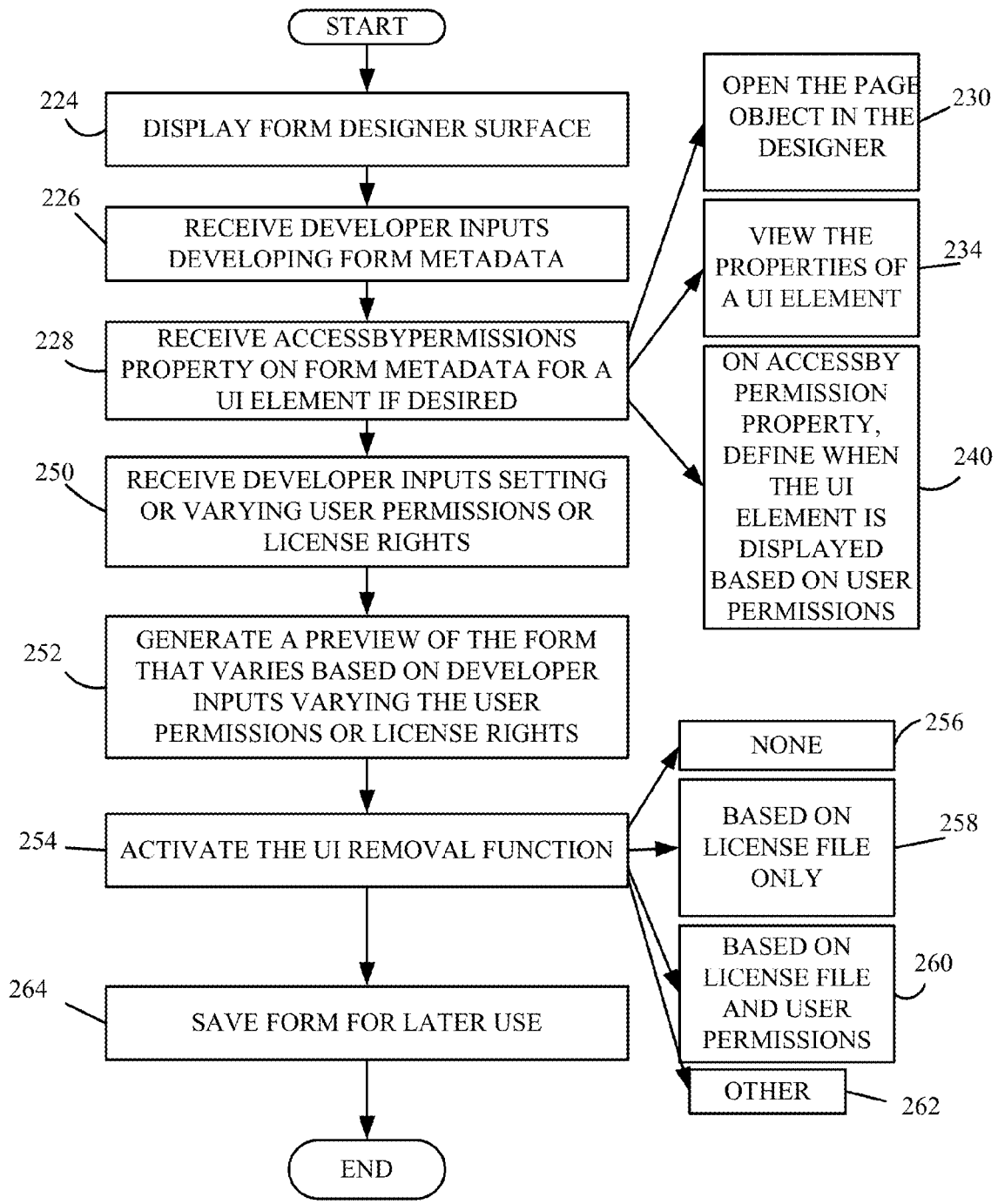
FIG. 5 is a flow diagram illustrating one example of the operation of a development environment shown in FIG. 1 in enabling a developer to add metadata to enable user-specific visualization of a page.

FIG. 5 is a flow diagram illustrating one example of how a developer 116 can configure a user interface element to be analyzed and removed based on a user's license rights and user permissions. Developer 116 first provides an input to development environment 104 accessing designer functionality 142 that allows developer 116 to develop and edit forms or other display pages. Developer 116 then provides an input to access the particular form or display that the user is going to edit. This is indicated by block 224 in FIG. 5. Developer 116 then provides input through form designer functionality 142 developing form metadata (such as creating, modifying, deleting, etc.) to represent the form or page. This is indicated by block 226.

There may be cases where UI elements (such as page fields, page actions, page parts, etc.) cannot be automatically removed using the analysis described above with respect to FIG. 3, and developer 116 may need to make such a UI element visible or hidden, depending on access permissions to another object. For instance, the developer may need to establish a relation between a UI element and the permission for another object. As one specific example, it may be that a group of page fields are all related to a specific functional area and only part of these can be automatically removed based on their table relation or their action references to table objects. The remaining fields within the same functional group may be simple data fields, with no relations. Therefore, they cannot be automatically removed based on the user's permissions or license rights. It may also be, however, that developer 116 may still wish to remove these fields, because they may not make sense for the user without the other fields that will be removed.

Thus, in one example, form designer functionality 142 allows developer 116 to enrich the metadata for the page fields by defining a dependency to another object that is related to the fields. In one example, a given property may be available on table fields that will apply, through inheritance, to page fields. It may also be available on page fields, page actions, page parts, etc. Developer 116 can use such a property to define the permission that relates the given UI element (for example, page fields) to another object. With the enriched metadata in place, page/form display generator 122 can then automatically remove the fields in question, based on the user permissions and the user license rights.

In the example described with respect to the flow diagram of FIG. 5, the property will be referred to as the "AccessByPermissions" property. This is just one example and the property can be referred to in other ways as well. Therefore, while the developer 116 is generating metadata for the display, the developer can provide inputs configuring the "AccessByPermissions" property on the form metadata for a UI element, if desired. This is indicated by block 228 in FIG. 5.

Figure 5A:
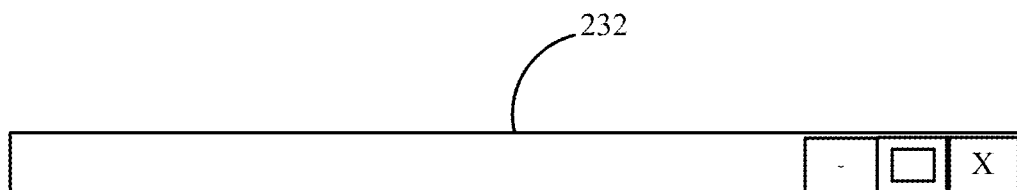

In order to do this, in one example, developer 116 opens the page object in the designer functionality 142. This is indicated by block 230. FIG. 5A shows one example of a user interface display that can be generated when the developer does this. FIG. 5A shows user interface display 232 for a table (referred to as Table A). It identifies the fields, field names, data types for those fields, etc., in Table A. Developer 116 then selects a field and views the properties associated with that field. This is indicated by block 234 in the flow diagram of FIG. 5. FIG. 5B shows one example of a user interface display 236 that illustrates this.

FIG. 5B shows that display 236 includes a set of properties and values for field B in Table A, which was selected from the user interface display shown in FIG. 5A. It can be seen that field B includes the "AccessByPermissions" property 238.

In one example, developer 116 then selects the "AccessByPermissions" property to define when the corresponding UI element (e.g., field B) is displayed based on user permissions and the user license rights. This is indicated by block 240 in the flow diagram of FIG. 5.

Figure 5C:
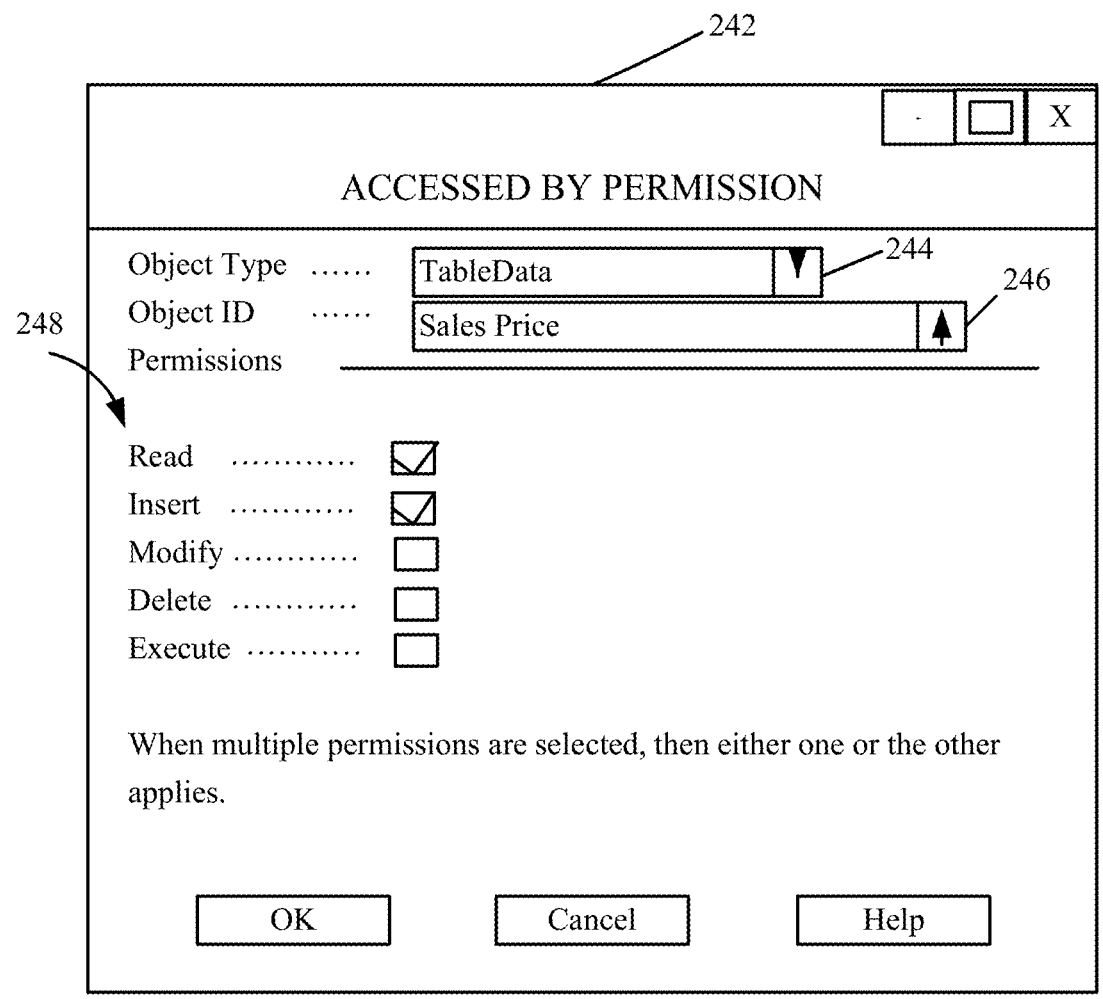

FIG. 5C shows one example of a user interface display 242 that can be generated by form designer functionality 142, and that allows developer 116 to define when a corresponding UI element is displayed. It can be seen in FIG. 5C that user interface display 242 includes an object type indicator 244, an object identifier 246 and a permissions section 248. In the example shown in FIG. 5C, the developer can identify the object using identifier 244 and object ID 246, and then select the types of permissions that are needed by a user in order to access that object. It can be seen in the example shown in FIG. 5C that, for the UI element being configured, the related object type is TableData and the object ID identifies the sales price table. Developer 116 has indicated that a user must have "read" and "insert" permissions in order to access the sales price table data. Therefore, if the corresponding UI element being configured is on a page that the user has requested, the requesting user must have "read" and "insert" permissions to the sales price table data, or that UI element will be removed from the page, before it is displayed to the requesting user.

In one example, developer 116 can provide these types of development inputs for a variety of different UI elements. Therefore, on any page where those UI elements are displayed, they can be removed based on user permissions and license rights. It will also be noted that, in another example, objects can be grouped and developer 116 can set the user permissions and license rights needed to access the group, as a whole. For instance, objects can be grouped into feature areas (such as finance, marketing, project management, or others). Developer 116 can then give a user permissions to have UI elements that are related to a feature area displayed by configuring on a feature area basis, instead of on an individual object basis.

Returning again to the flow diagram of FIG. 5, developer 116 can also, in one example, see previews of pages or forms. By way of example, developer 116 can modify a user's permissions or license rights. This is indicated by block 250 in FIG. 5. Page previewer 148 in development environment 104 then illustratively generates a preview of the form or page under development. The preview will vary based upon the developer inputs varying the user permissions or license rights. Generating such a preview is indicated by block 252. Thus, as the user turns on or off user permissions or license rights, the fields, actions, subpages, subparts, etc. on the corresponding display preview will appear and disappear, depending upon whether the user permissions and license rights authorize the display of those items to a given user.

When developer 116 is finished developing, developer 116 illustratively activates the UI removal function in page/form display generator 122. This is indicated by block 254. This functionality can be activated at different levels. For instance, it can be turned off as indicated by block 256. The license verification component 156 can be activated while permission verification component 154 is deactivated. Therefore, the UI removal functionality will be activated based only on the user's license rights. This is indicated by block 258. In another example, developer 116 can activate both components 154 and 156 so that UI removal is performed based on the user's license rights and permissions. This is indicated by block 260. The UI removal functionality can be activated in other ways well, and this is indicated by block 262. The configured form or page is then saved for later use by business system 102. This is indicated by block 264.

A number of additional examples are worth noting. The above description has proceeded with respect to the user's license rights and permissions being accessed and processed relative to the UI element on a requested page, during runtime, when the page is requested. It will be noted, however, that some or all of the processing can be pre-computed and stored for access during runtime. Thus, when a user requests a page, the system may access a mapping between the user and the page to identify the UI elements that are to be removed, the mapping having been already pre-computed.

Also, the present description has proceeded with respect to removing UI elements from a page or form based on the user permissions and the user license rights. It will be appreciated that the term "removing" covers hiding and disabling as well. Also, however, the same can be done for form or page behavior. For instance, the form or page may have corresponding logic that generates certain behaviors (such as generating drop-down menus, changing ribbon displays, performing data processing on business data, etc.). In one example, this behavior can also be removed based on user permissions or license rights.

It can thus be seen that the present description provides that a page can be defined by metadata. The page definition metadata can advantageously be parsed either at runtime, or beforehand, before populating the page for a given user. User interface elements on the page are removed or disabled based on what the different elements permit the user to see or interact with. Thus, UI elements, like actions, fields and page parts can be removed, prior to displaying the page to the given user. Where this processing is done on a server, it can be done before sending the page to a client device or on the client device, itself. The present description thus removes UI elements that might otherwise cause a permission error either when the page is populated or when the given user invokes a page action that the user is not permitted to invoke. This can significantly improve the operation of the system itself. It will avoid throwing errors, and thus improve both the efficiency of operation of the system itself, and the user experience. It may surface only UI elements that a user is permitted to see or interact with, or both. This makes the surfaced information more accurately match the permissions of the user and avoids user confusion because the user will not be shown, for instance, UI elements that purport to allow the user to take an action but, when invoked, actually generate an error. The present description also allows a developer to quickly define a page and see how its representation will change when displayed to users with different permissions or rights, etc. This enables the developer to develop the page more quickly and with fewer permission errors. This also improves the operation of the system that uses the developed pages and the development environment where the pages are developed.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
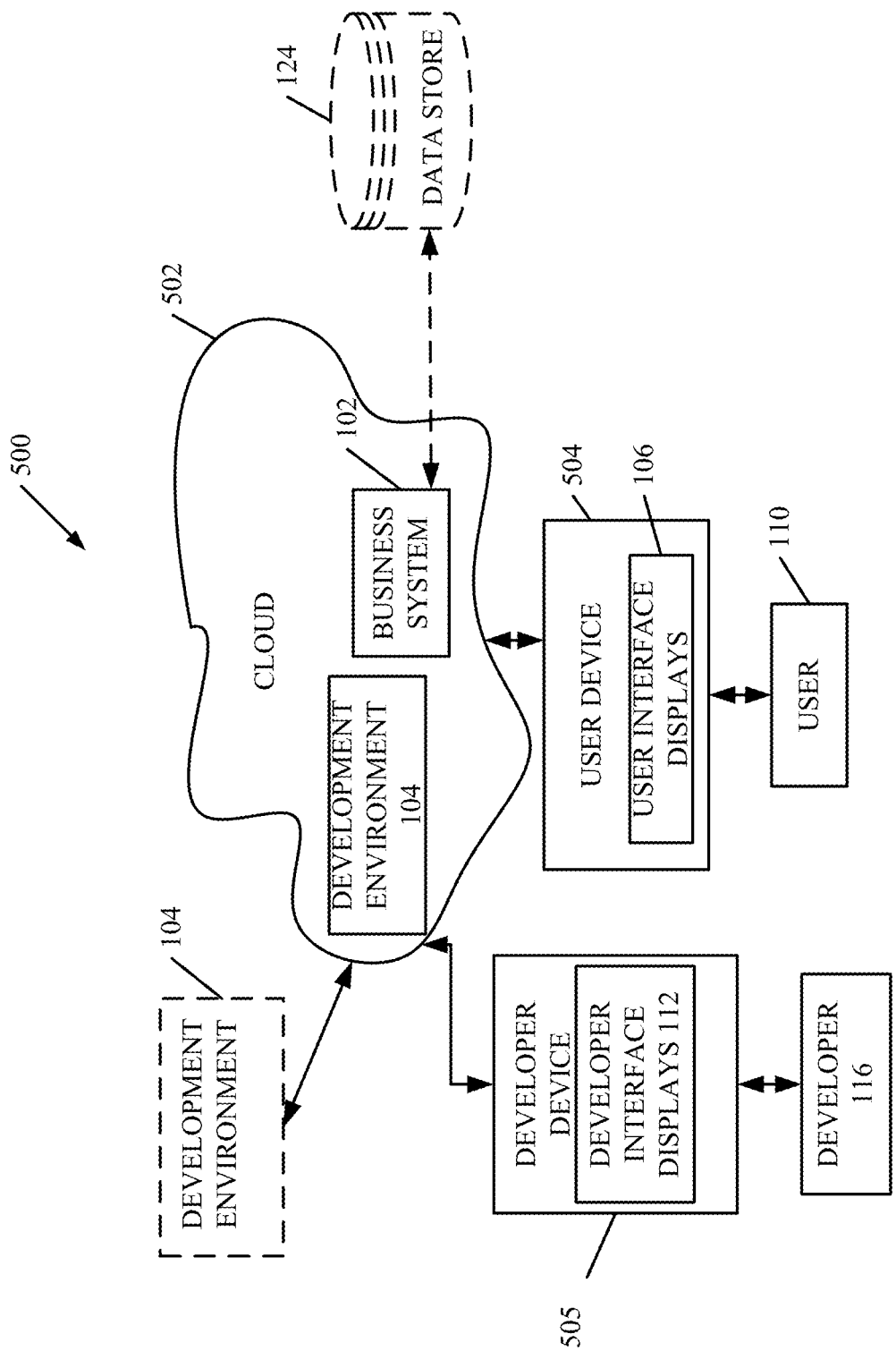
FIG. 6 shows one example of the architecture shown in FIG. 1, deployed in a cloud computing architecture.

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 6, some items are similar to those shown in FIG. 1 and they are similarly numbered. FIG. 6 specifically shows that business system 102 and development environment 104 can be located in cloud 502 (which can be public, private, or a combination where portions are public while others are private). Therefore, user 110 uses a user device 504 and developer 116 uses developer device 505 to access those systems through cloud 502.

FIG. 6 also depicts another embodiment of a cloud architecture. FIG. 6 shows that it is also contemplated that some elements of architecture can be disposed in cloud 502 while others are not. By way of example, data store 124 can be disposed outside of cloud 502, and accessed through cloud 502. In another embodiment, development environment 104 can also be outside of cloud 502. Regardless of where they are located, they can be accessed directly by devices 504 and 505, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
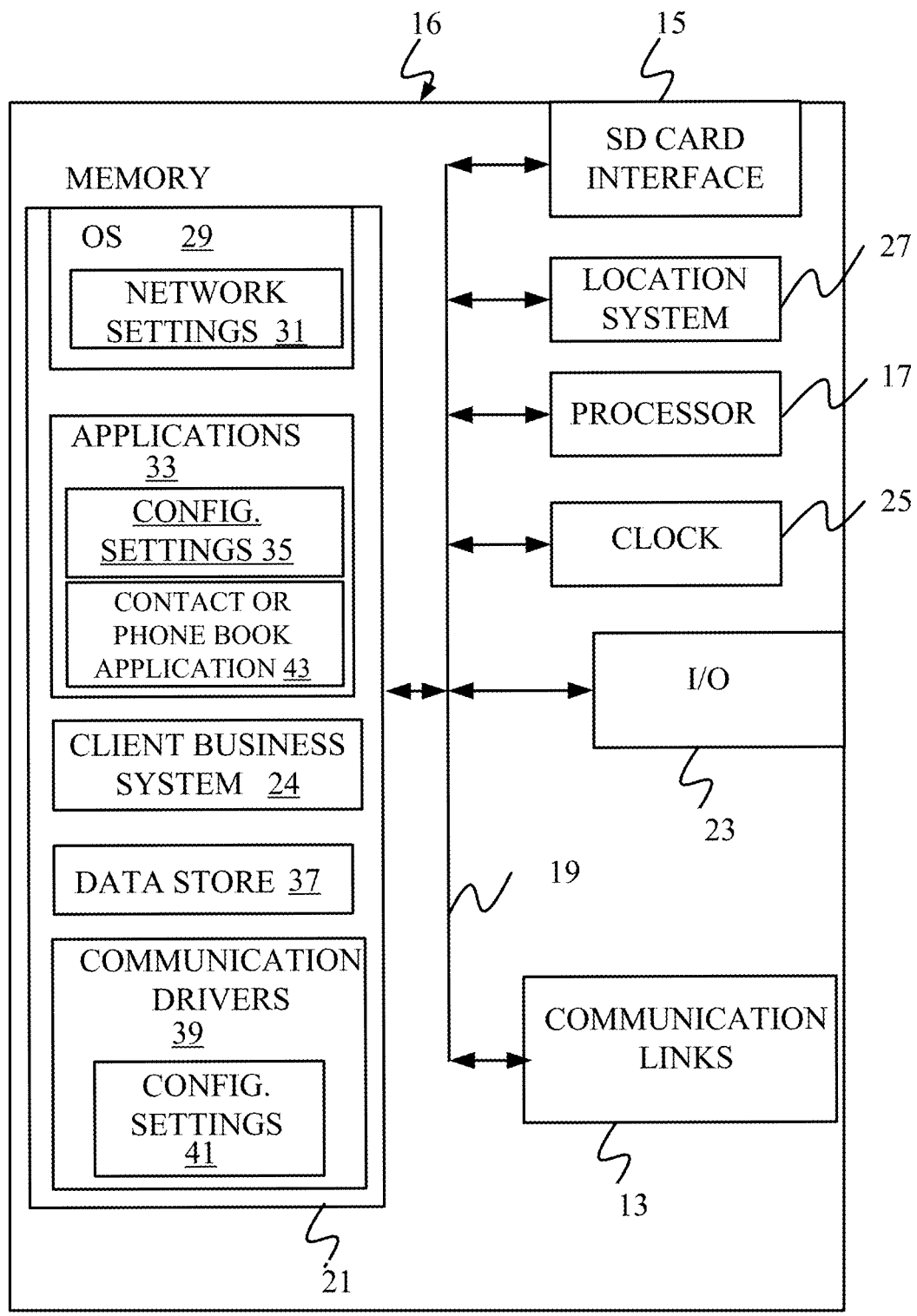
FIGS. 7-11 show examples of mobile devices.

FIG. 7 is a simplified block diagram of one illustrative embodiment of a handheld or mobile computing device that can be used as a user's or client's hand held device 16, in which the present system (or parts of it) can be deployed. FIGS. 8-11 are examples of handheld or mobile devices.

FIG. 7 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as any types or standards of Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 12 or 146 from FIG. 1 or the processors in any of the devices shown in FIG. 6) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Applications or the items in data store 124, for example, can reside in memory 21. Similarly, device 16 can have a client business system 24 which can run various business applications or embody parts or all of systems 102 or 104. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 (e.g., contact or phone book application 43) can be applications that have previously been stored on the device 16 or applications that are installed during use, although these can be part of operating system 29, or hosted external to device 16, as well.

Figure 8:
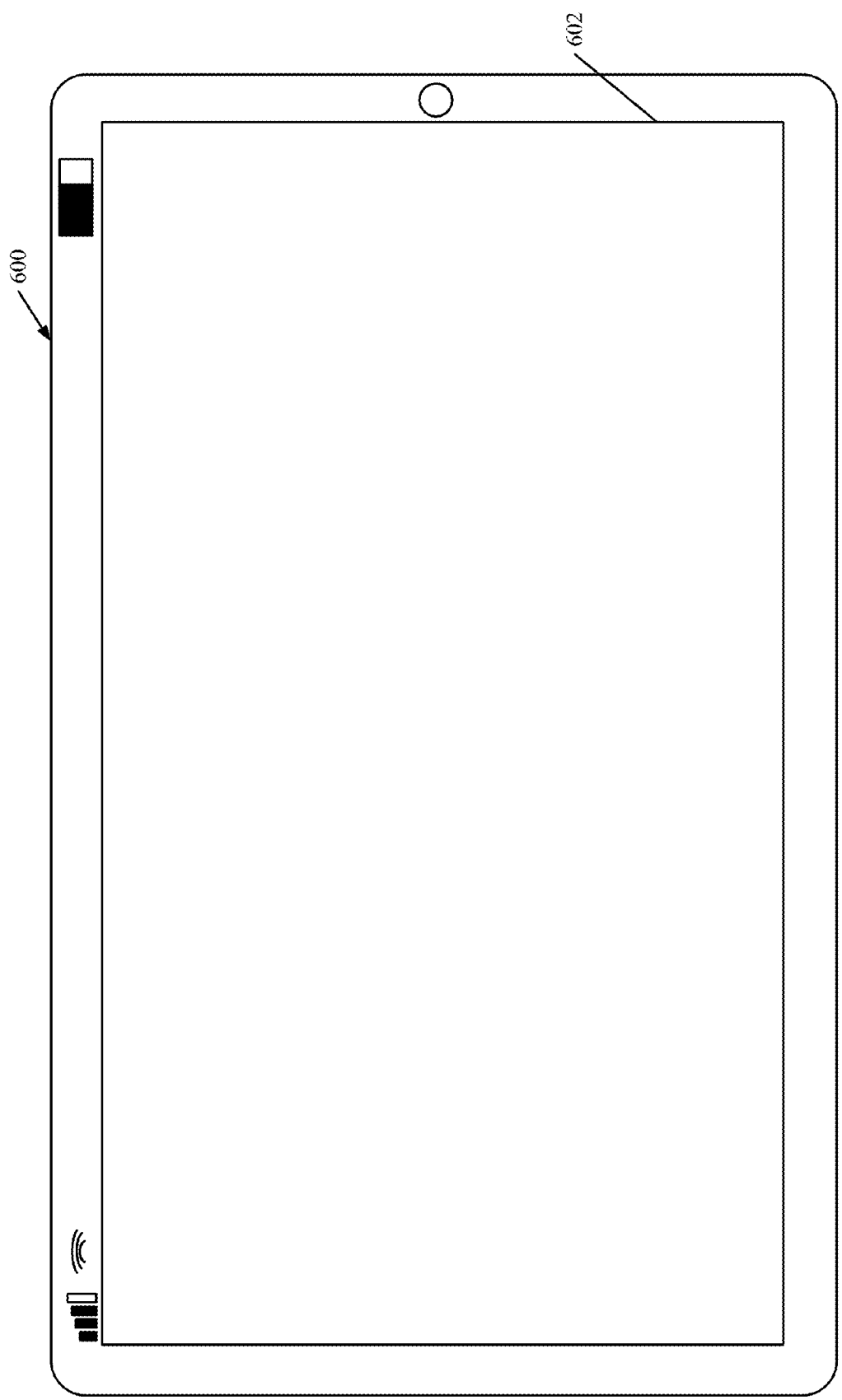

FIG. 8 shows one embodiment in which device 16 is a tablet computer 600. In FIG. 8, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 9:
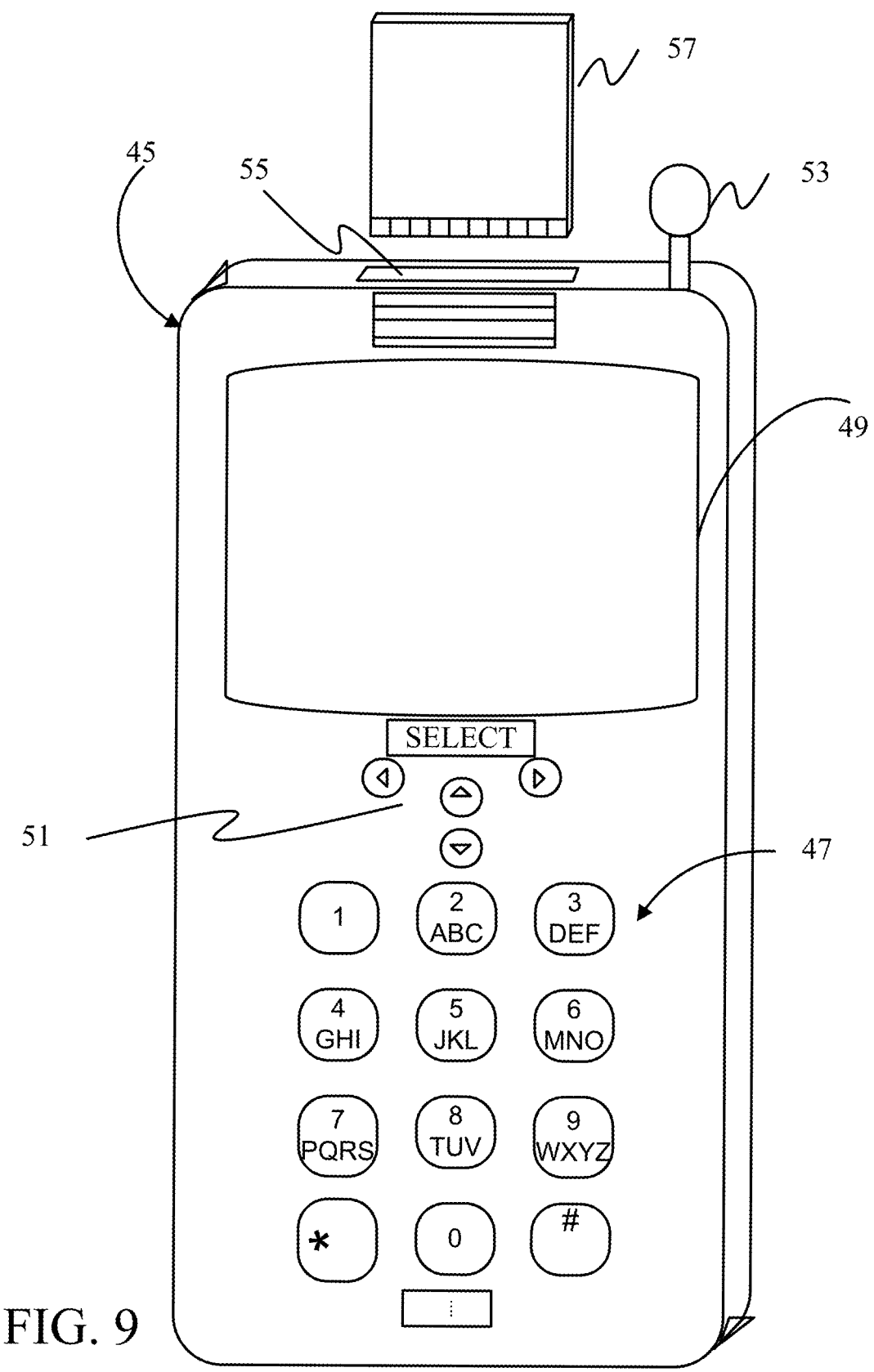
Figure 10:
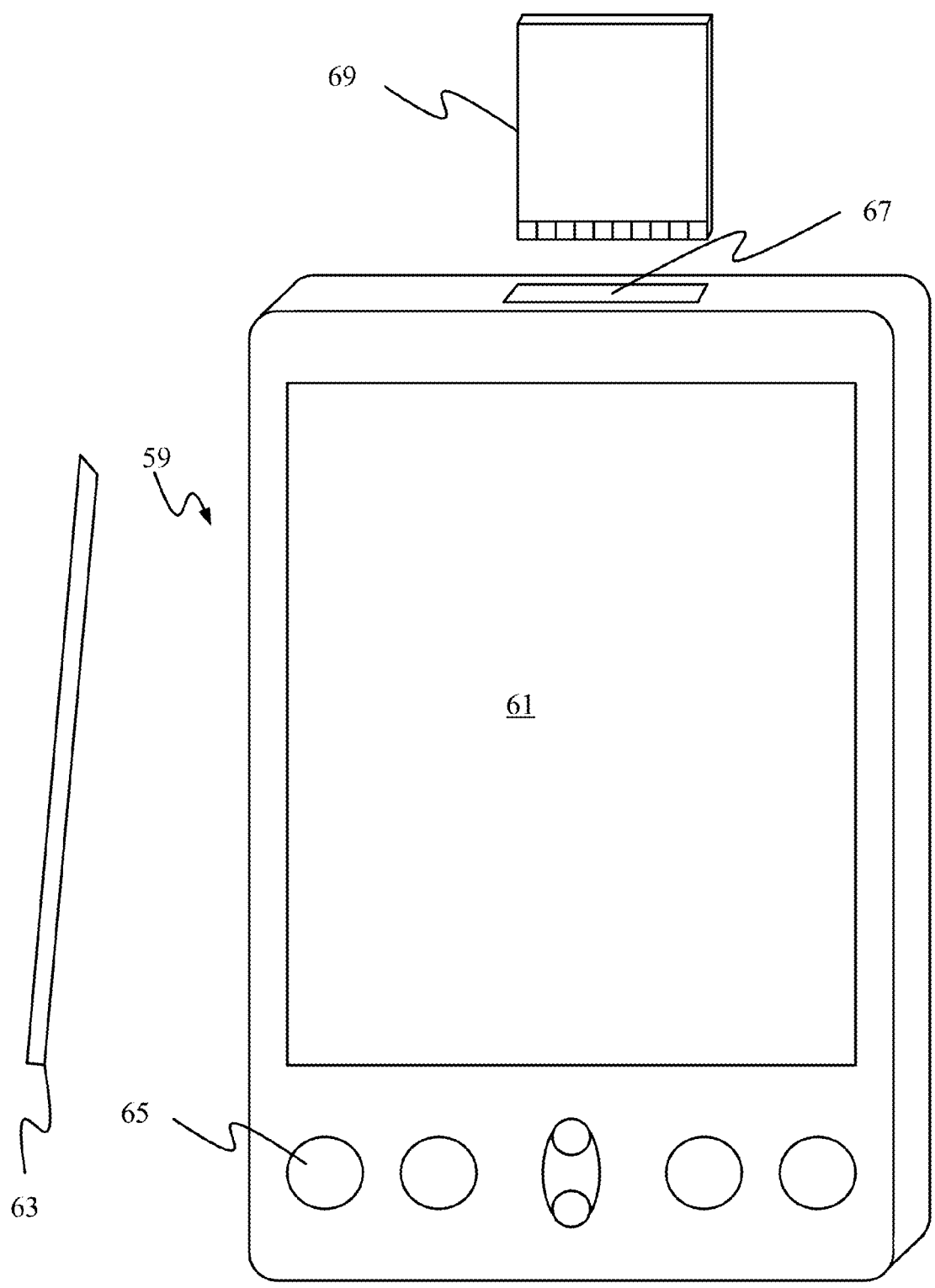

FIGS. 9 and 10 provide additional examples of devices 16 that can be used, although others can be used as well. In FIG. 9, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1xrtt, and Short Message Service (SMS) signals. In some embodiments, phone 45 also includes a Secure Digital (SD) card slot 55 that accepts a SD card 57.

The mobile device of FIG. 10 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 11:
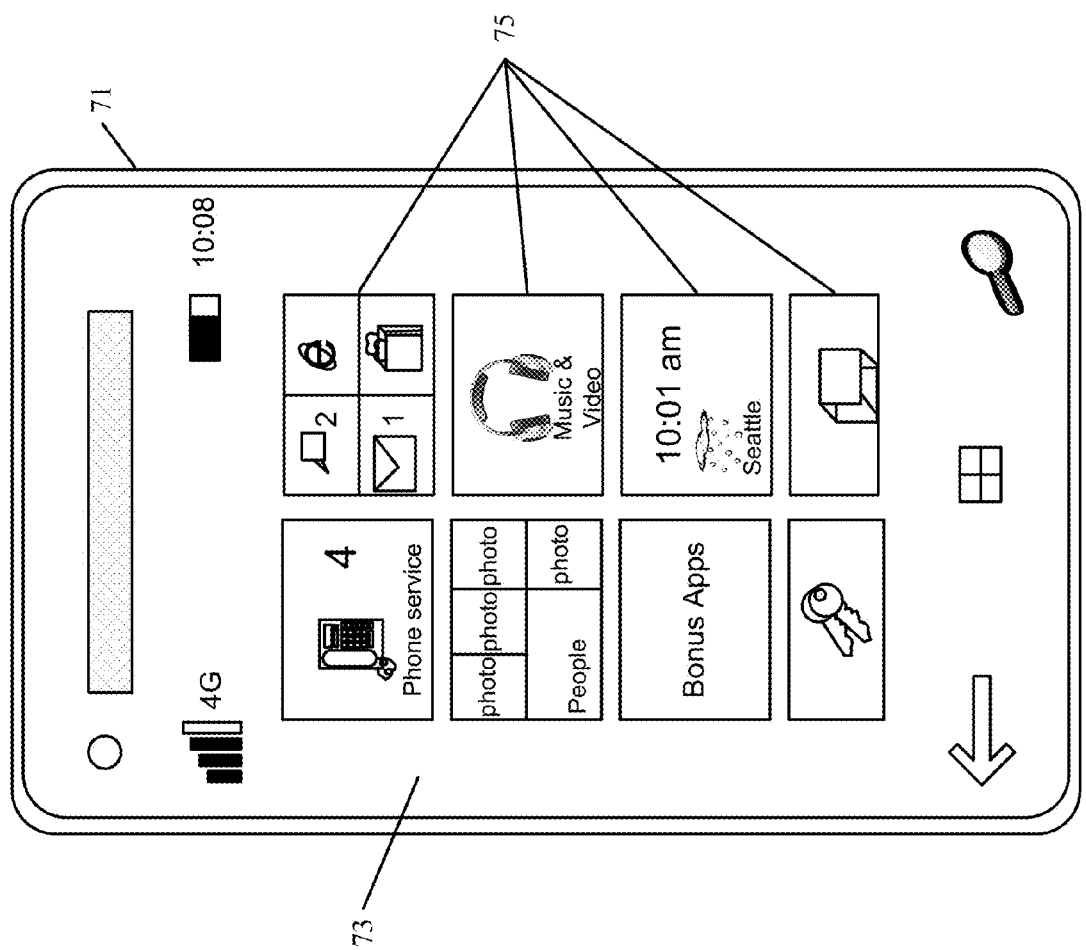

FIG. 11 is similar to FIG. 9 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
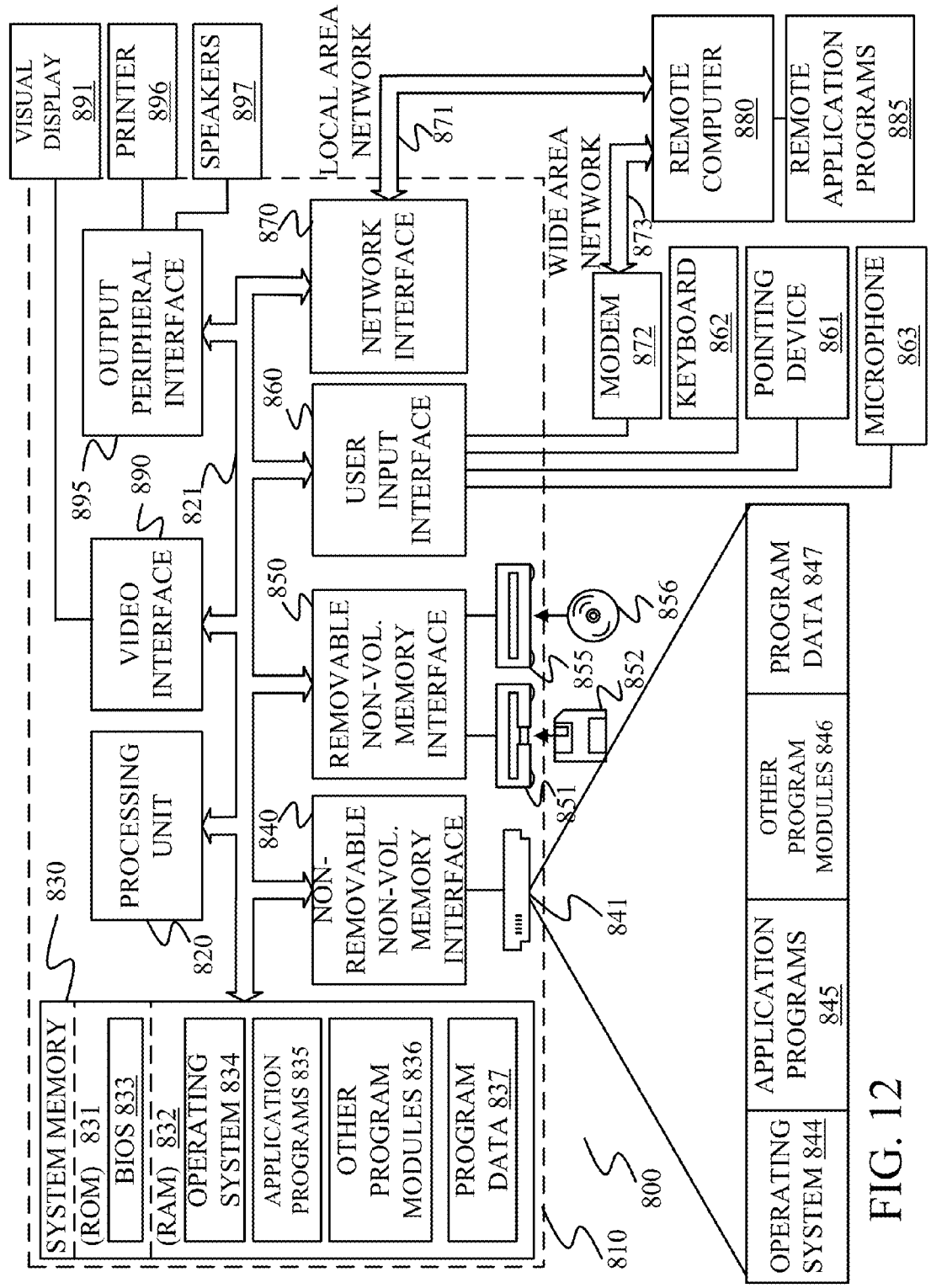
FIG. 12 shows a block diagram of one example of a computing environment.

FIG. 12 is one embodiment of a computing environment 800 in which architecture 100, or parts of it, (for example) can be deployed. With reference to FIG. 12, an exemplary system for implementing some embodiments includes a general-purpose computing device in the form of a computer 810. Components of computer 810 may include, but are not limited to, a processing unit 820 (which can comprise processor 120 or 146), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus En d ISA (EISA) bus, Video Electronics Standards Association ESA) local bus, and Peripheral Component Interconnect (PCI) bus als own as Mezzanine bus. Memory and programs described with respect to FIG. 1 can be deployed in corresponding portions o FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a metadata parsing component configured to receive page metadata defining user interface elements on a page;
a verification component configured to access user metadata, indicative of user access rights, corresponding to a given user; and
a page display generator configured to generate a modified page display based on whether the given user has user access rights to the user interface elements on the page.

Example 2 is the computing system of any or all previous examples wherein the verification component is configured to compare the user access rights to the page metadata to identify user interface elements for which the given user has insufficient user access rights.

Example 3 is the computing system of any or all previous examples wherein the page display generator removes the identified user interface elements from the modified page display, leaving remaining user interface elements on the modified page display, before it is displayed to the given user.

Example 4 is the computing system of any or all previous examples wherein the page display generator is configured to determine a location of the remaining user interface elements on the modified page display.

Example 5 is the computing system of any or all previous examples wherein the page display generator is configured to change the location of the remaining user interface elements on the modified page display, based upon which of the user interface elements are removed from the modified page display.

Example 6 is the computing system of any or all previous examples wherein the verification component comprises:
a permission verification component configured to access permissions for the given user and identify user interface elements which the given user is not permitted to access, based on the page metadata and the permissions.

Example 7 is the computing system of claim 6 wherein the verification component further comprises:
a license verification component configured to access license rights for the given user and identify user interface elements to which the given user does not have license rights, based on the page metadata and the license rights.

Example 8 is the computing system of any or all previous examples wherein the page metadata includes field metadata defining a field on the page that is related to an object, and wherein the verification component is configured to identify whether the given user has access rights to the object and, if not, remove the field from the modified page display.

Example 9 is the computing system of any or all previous examples wherein the page metadata includes action metadata defining an action user input mechanism on the page that is related to a target object and wherein the verification component is configured to identify whether the given user has user access rights to the target object and, if not, remove the action user input mechanism from the modified page display.

Example 10 is the computing system of any or all previous examples wherein the page display generator is configured to remove the identified user interface elements from the modified page display by eliminating them from the modified page display or disabling them on the modified page display.

Example 11 is a computing system, comprising:

a form designer component configured to display properties of a selected user interface element on a selected form and provide a user input mechanism that is configured to be actuated to define element access rights, corresponding to the user interface element, for accessing the selected user interface element on the selected form; and a page previewer component that is configured to receive inputs varying user access rights corresponding to a user and to generate varying preview displays of the selected form by varying which user interface elements on the selected form are displayed based on variation of the user access rights.

Example 12 is the computing system of any or all previous examples wherein the page previewer component is configured to generate the varying preview displays by comparing the element access rights for each user interface element on the selected form with the user access rights and by removing from a given preview display all user interface elements on the selected form for which the user access rights do not conform to the element access rights corresponding to each user interface element.

Example 13 is the computing system of any or all previous examples wherein the user input mechanism is actuated to define when the selected user interface element is displayed on the selected form, based on user access rights corresponding to a user viewing the selected form.

Example 17 is a method, comprising:

receiving a page selection user input identifying a selected page to be displayed to a given user;

obtaining page metadata defining user interface elements on the selected page;

obtaining user metadata, indicative of user access rights, corresponding to the given user; and generating a page display that selectively includes the user interface elements on the selected page based on whether the given user has user access rights to the user interface elements on the page.

Example 15 is the method of any or all previous examples wherein generating a page display comprises:

comparing the user access rights to the page metadata to identify user interface elements for which the given user has insufficient access rights; and removing the identified user interface elements from the page display, leaving remaining user interface elements on the page display, before it is displayed to the given user.

Example 16 is the method of any or all previous examples wherein generating the page display comprises:

modifying the location of the remaining user interface elements on the page display, based upon which of the user interface elements are removed from the page display.

Example 17 is the method of any or all previous examples wherein obtaining user metadata comprise accessing permissions for the given user and wherein comparing the user access rights comprises identifying user interface elements which the given user is not permitted to access, based on the page metadata and the permissions.

Example 18 is the method of any or all previous examples wherein obtaining user metadata comprises accessing license rights for the given user and wherein comparing the user access rights comprises identifying user interface elements to which the given user does not have license rights, based on the page metadata and the license rights.

Example 18 is the method of any or all previous examples wherein removing the identified user interface elements from the page display comprises:

eliminating the identified user interface elements from the page display.

Example 20 is the method of any or all previous examples wherein removing the identified user interface elements from the page display comprises:

disabling the identified user interface elements on the page display.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:

a processor; and memory storing instructions executable by the processor, wherein the instructions configure the computing system to:

generate a representation of a form designer user interface display that represents a form comprising a plurality of user interface elements, the form designer user interface display including an element access right user input mechanism;

based on an indication of user actuation of the element access right user input mechanism, generate form metadata that defines element access rights corresponding to the plurality of user interface elements on the form, each element access right defining an access right to a corresponding, one of the user interface elements on the form; and generate a representation of a page preview user interface display configured to display a set of varying preview displays of the form based on the form metadata, wherein each particular preview display, in the set of preview displays, corresponds to a different user access right and displays one or more user interface elements, from the plurality of user interface elements, that are identified as being accessible by the user access right corresponding to the particular preview display, and the page preview user interface display comprises a user access right user input mechanism;

based on an indication of user actuation of the user access right user input mechanism, identify a series of varying user access rights; and based on the identified series of varying user access rights, define a series of the varying preview displays of the form; and dynamically modify the representation of the page preview user interface display to navigate the defined series of varying preview displays.

2. The computing system of claim 1 wherein the instructions configure the computing system to generate each preview display in the series of varying preview displays by:

comparing an element access right for each user interface element on the form with the corresponding user access right, and removing from the preview display all user interface elements on the form for which the corresponding user access right does not conform to the element access right for each user interface element.

3. The computing system of claim 2 wherein the instructions configure the computing system to:

based on the indication of user actuation of the element access user input mechanism, define when the user interface element is displayed on the form, based on a user access right corresponding to a user viewing the form.

4. The computing system of claim 1, wherein each particular preview display, in the set of preview displays, represents a modified version of the form.

5. The computing system of claim 4, wherein each particular preview display represents a modified version of the form, that is modified by removing one of the user interface elements.

6. The computing system of claim 5, wherein each particular preview display represents a modified version of the form, that is modified by eliminating one of the user interface elements.

7. The computing system of claim 5, wherein each particular preview display represents a modified version of the form, that is modified by disabling one of the user interface elements.

8. The computing system of claim 5, wherein each particular preview display represents a modified version of the form, that is modified by changing a layout of the user input mechanisms based on the removal of the user input mechanism.

9. The computing system of claim 1, wherein the plurality of user interface elements comprise one or more data entry fields.

10. The computing system of claim 1, wherein the series of varying user access rights is based on user license rights.

11. A computer-implemented method comprising:

generating a representation of a form designer user interface display that represents a form comprising a plurality of user interface elements, the form designer user interface display including an element access right user input mechanism;

based on an indication of user actuation of the element access right user input mechanism, generating form metadata that defines element access rights corresponding to the plurality of user interface elements on the form, each element access right defining an access right to a corresponding one of the user interface elements on the form;

generating a representation of a page preview user interface display configured to display a plurality of different preview displays of the form based on the form metadata, wherein each respective preview display, in the plurality of different preview displays, corresponds to a different user access right and displays one or more user interface elements, from the plurality of user interface elements, that are identified as being accessible by the user access right corresponding to the respective preview display, and the page preview user interface display comprises a user access right user input mechanism;

based on an indication of user actuation of the user access right user input mechanism, identifying an access right set that comprises at least two different user access rights;

based on the identified access right set, defining a preview display set comprising at least two of the different preview displays that correspond to the user access rights in the access right set; and dynamically modifying the representation of the page preview user interface display to navigate the preview displays in the preview display set.

12. The computer-implemented of claim 11, and further comprising:

generating each respective preview display, in the plurality of different preview displays, by:

comparing an element access right for each user interface element on the form with the corresponding user access right, and removing, from the respective preview display, all user interface elements on the form for which the corresponding user access right does not conform to the element access right.

13. The computer-implemented of claim 12, and further comprising:

based on the indication of user actuation of the element access user input mechanism, defining when the user interface element is displayed on the form, based on a user access right corresponding to a user viewing the form.

14. The computer-implemented of claim 11, wherein each respective preview display, in the plurality of different preview displays, represents a modified version of the form.

15. The computer-implemented of claim 14, wherein each respective preview display, in the plurality of different preview displays represents a modified version of the form that is modified by removing one of the user interface elements.

16. The computer-implemented of claim 15, wherein each respective preview display, in the plurality of different preview displays, represents a modified version of the form that is modified by eliminating one of the user interface elements.

17. The computer-implemented of claim 15, wherein each respective preview display, in the plurality of different preview displays, represents a modified version of the form that is modified by disabling one of the user interface elements.

18. The computer-implemented of claim 15, wherein each particular preview display represents a modified version of the form, that is modified by changing a layout of the user input mechanisms based on the removal of the user input mechanism.

19. The computer-implemented of claim 11, wherein the plurality of user interface elements comprises one or more data entry fields.

20. The computer-implemented of claim 11, wherein the user access rights in the access right set are based on user license rights.

* * * * *